US006119110A

United States Patent [19]

Carapelli

[11] Patent Number: 6,119,110

[45] Date of Patent: Sep. 12, 2000

[54] MEASURING DEVICE, PARTICULARLY FOR FUEL PUMPS

[75] Inventor: Giovanni Carapelli, Florence, Italy

[73] Assignee: Logitron S.R.L., Florence, Italy

[21] Appl. No.: 08/971,663

[22] Filed: Nov. 17, 1997

[51] Int. Cl.[7] .............................. G06F 17/60; H04K 1/06

[52] U.S. Cl. .......................... 705/413; 235/94 A; 377/13; 377/15; 377/16; 380/255; 380/28; 380/287; 702/45; 702/46

[58] Field of Search ............................... 235/94 R, 94 A; 377/13, 15, 16; 380/23, 25, 49, 28, 255, 287; 702/45, 46; 705/400, 413; 713/168

[56] References Cited

U.S. PATENT DOCUMENTS

| | | | |
|---|---|---|---|
| 4,410,949 | 10/1983 | Huellinghorst et al. | 364/465 |
| 4,812,912 | 3/1989 | Chickneas et al. | 705/408 |
| 5,208,742 | 5/1993 | Warn | 364/131 |
| 5,742,684 | 4/1998 | Labaton et al. | 380/24 |
| 5,912,972 | 6/1999 | Barton | 380/23 |

FOREIGN PATENT DOCUMENTS 2551741 3/1985 France .

*Primary Examiner*—Edward R. Cosimano
*Attorney, Agent, or Firm*—Abelman Frayne & Schwab

[57] ABSTRACT

Measuring device, particularly for fuel pumps in service stations, comprising a pulser equipped with a microprocessor unit and an electronic head equipped with a microprocessor unit, in which device the pulser and the electronic head are connected and mutually communicate information and data correlated to the supply; the information and the data are encrypted by means of an algorithm loaded in said microprocessor units and are sent to the electronic head from the pulser together with the measurement values of each supply, in order to allow the verification and the validation of the transmitted data.

12 Claims, 2 Drawing Sheets

MEASURING DEVICE, PARTICULARLY FOR FUEL PUMPS

FIELD OF THE INVENTION

The present invention refers to the field of measuring devices which associate a numeric value to a physical entity (mass, flow, electric voltage) to be measured. More particularly, the invention refers to devices intended both to perform an accurate measurement and to guarantee that the numeric value obtained actually corrensponds to the entity which has been measured. That guarantee is particularly relevant when such value has financial implications, for example when used in the fuel pumps of service stations.

BACKGROUND OF THE ART

At present, the measuring devices installed in the service stations comprise a trasducer which transforms the fuel flow supplied into revolutions of a shaft connected with an encoder device (hereinafter called "pulser"). The pulser transforms the number of revolutions into a number of pulses which are subsequently counted by a suitable electronic device (hereinafter called "electronic head") and then transmitted to an electronic display which shows the numeric value corresponding to the quantity of the fuel supplied.

For fiscal reasons, such measuring devices are subjected to certifications and approvals and have to be sealed so that they are tamperproof to avoid any fraudolent modifications of the measurement.

In practice, known measuring devices have several weak points from the point of view of possible tampering with the measurements and which can occur in the ways that follow:

- modification of the pulser disk: increasing the index points number, which relates to a certain number of disk revolutions, thereby increasing the number of pulses and causing a higher numeric value to be visualized by the display;
- a pulse multiplier can be inserted in the transmission line between the pulser and the electronic head;
- the software of the electronic head can be modified;
- the software of the display or the data thereto transmitted by the electronic head can be modified;
- the electronic equipment can be replaced.

Such cares of tampering are furthermore facilitated due to the technical difficulty of detecting them. This difficulty is often hard to overcome for the control officers.

SUMMARY OF THE INVENTION

A first aim of the invention is to overcome the drawbacks of the prior art and to guarantee tamperproof measurements as far as it concerns the economical interests of the customers and the control officers operations.

A second aim is to make the measuring devices of the existing fuel pumps in service stations tamperproof.

A third aim is to facilitate and make more efficient the operations of the control officers.

The aims have been reached according to the invention by a measuring device comprising a pulser with a microprocessor unit and an electronic head with a microprocessor unit.

In order to check the transmitted data, the pulser and the electronic head are connected and mutually communicate encrypted data, correlated with the pulses which are sent from the pulser to the electronic head. The encrypted data are processed by a dynamic key encryption software loaded into the aforementioned microprocessor units.

A further feature of the invention consists in the fact that all the electronic circuits are resin-coated in order to avoid tampering.

In a preferred embodiment of the invention, the display presents a microprocessor unit able to process the same encryption algorithm of the electronic head and to perform the same data transmission and the same control of the encryption key when the data are sent to the display from the electronic head.

Furthermore, a remote control is carried out by means of a local host computer or a "master" unit connected to remote positions.

A first advantage substantially consists in the fact that possible tamperings are made difficult and, at the same time, control operations are facilitated.

A second advantage consists in the relatively easy installation of the device, which is suitable for installation into both new and existing fuel pumps.

In more details, the microprocessor unit of the pulser allows the user to carry out the required control operations by means of the same cables already installed and to optimize the number of connections.

A third advantage consist in the possibility of instantaneously carrying out said control operations from remote units and independently from the control officers competence.

BRIEF DESCRIPTION OF THE DRAWINGS

Still further advantages will be evident from the following description and the annexed non-limitative drawings, in which.

In the Fig. N are input pulses, A is a pulser, C is an electronic Head, D is an electronic display, Kr is a resulting encryption key, Kd is a dynamic encryption Key, Ks is a secret encryption key, s is a signal of completed counting, Xa is a Kr-encrypted data produced by the pulser, Xc is a Kr-encrypted data produced by the head, and Nd is a numeric value processed by display D.

DETAILED DESCRIPTION OF THE INVENTION

Figure 1:
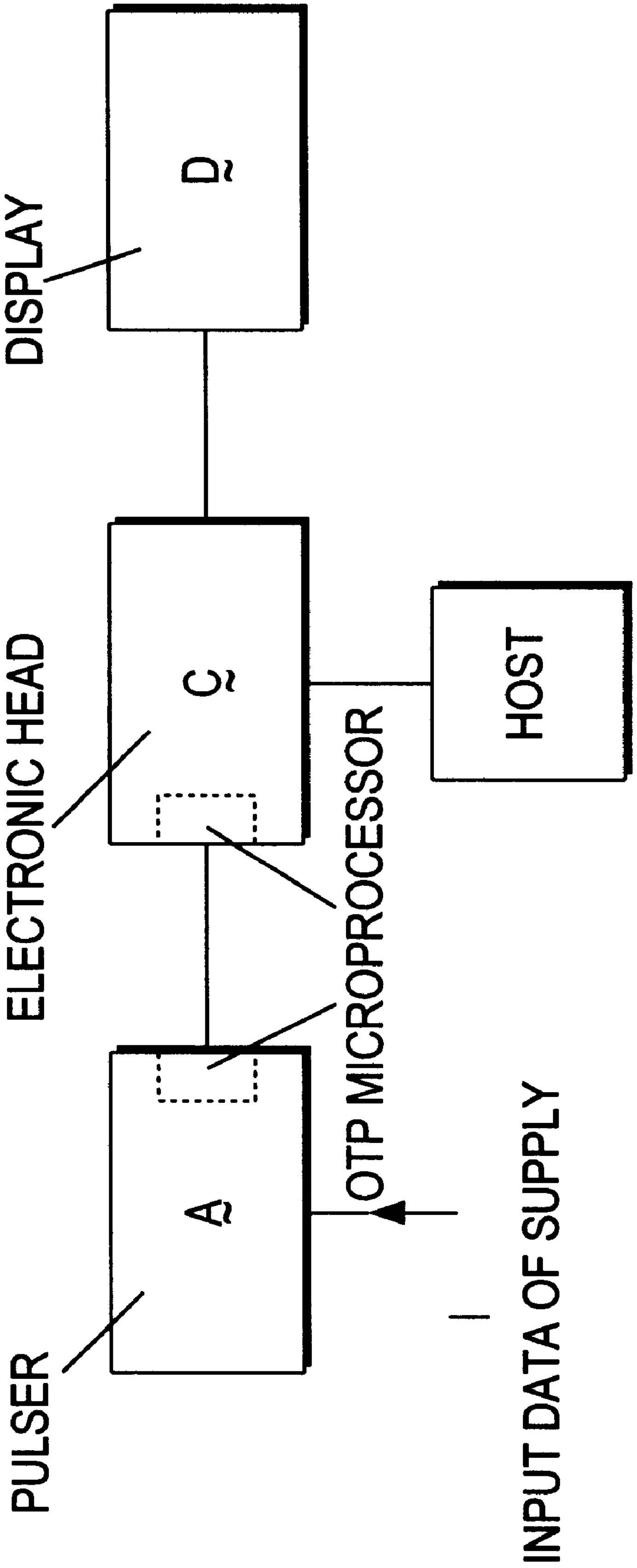
FIG. 1 schematically shows pulser, electronic head and display of a device according to the invention, provided with the transmission cables.

With reference to FIG. 1, the measuring device of the invention comprises substantially a pulser A, an electronic counter head C and a display D to visualize is the measurements.

The present description refers to a preferred embodiment of the measuring device intended to be used in the fuel pumps in service stations.

In such stations, the pulser A is placed downstream from the trasducer which converts the supplied fuel flow into the corresponding number of revolutions of a shaft directly coupled to the pulser disk. The number of shaft revolutions provides input data I which relates to the supplied fuel flow. The pulser A is provided with an "OTP" non re-readable microprocessor unit able to count and then to send the pulses to the electronic head C. The pulses are also filtered and normalized by the microprocessor unit in order to correct possible errors due to inaccurate encoder disk revolutions.

Head C also contains a microprocessor unit (having an "OTP" microprocessor) into which is loaded a software to transmit/receive data to and from the pulser A and the display D.

During each supply 1, the pulser A sends the pulses to the electronic head C, counts them and subsequently sends to the head C the corresponding numeric value encrypted by means of a dynamic public keys algorithm in order to verify the supply entity. The serial syncronous channel used in the transmission is the same as that utilized in the pulse transmission of traditional devices and does not require specific metric type-approvals.

The electronic head C communicates to the pulser when the counting of the pulses has been completed and receives in syncronous mode the encrypted data from the pulser.

The encrypted data are verified by the head C which decrypts the data by means of the same algorithm of the pulser A.

Figure 2:
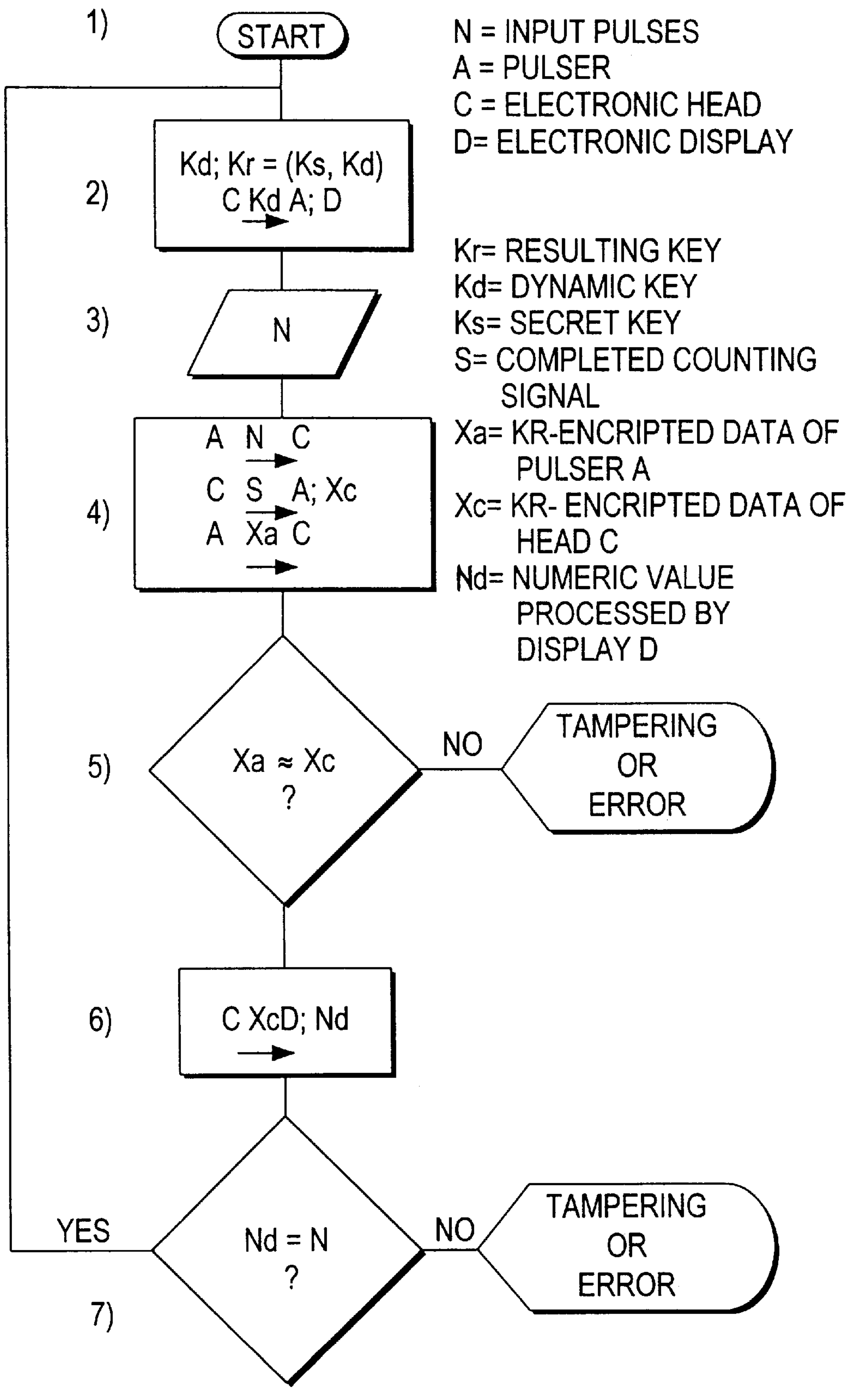
FIG. 2 shows a flowchart of the logic sequence utilized to transmit and/or receive the pulses number and the encryption data, from and to the device components.

FIG. 2 shows a suitable logic sequence for data and information transmission between the pulser A and the electronic head C.

When the device is turned on, block 1 of FIG. 2 pulser A, electronic head C and display D "know" a constant secret key Ks which has been introduced on manufacturing and are programmed with the same encryption algorithm.

During each supply the head C block 2 of FIG. 2 creates a dynamic key Kd, by means of a "seed", for example an incremental counter which acts as input of a pseudo-random algorithm. The encryption algorithm is a non reversible algorithm similar to the DES (Data Encryption System) which combines the constant key Ks with the dynamic key Kd to produce a resulting key Kr. The dynamic key Kd is communicated from the head C to the pulser A and the display D together with further possible control data.

During the counting block 3 of FIG. 2, the N pulses are transmitted block 4 of FIG. 2 on a channel from the pulser to the head C, which carries out the counting and then transmits to the pulser, on a separate channel, a signal s when the counting has been completed. After that, a control and validation step can start, during which the pulser trasmitts to the head C the counting Kr-encrypted data Xa. The head C block 5 of FIG. 2 decryptes the data and then repeats the encryption of the same (producing a data Xc) in order to compare the encrypted data Xa of the pulser with the encrypted data Xc. The same encrypted data are transmitted block 6 of FIG. 2 from the head C to the display D. The pulser A, the head C and the display D use the same encryption algorithm, in order to run simultaneously during the operations of each succeeding supply.

In the invention the electronic circuit of the pulser is resin-coated to avoid tampering with the electronic components and specifically with the digital/analogic convertion components.

The private keys and at least a part of the encryption algorithm of the head are loaded in the internal memory area EEPROM, which is not re-readable and can be used as a tamper-proof area.

As a result, the only possible tampering is by modifying the number of index points of the pulser disk.

However, such tampering would be evident because it produces a constant error similar to an improper calibration of the device.

From a different point of view, the addition of index points would be usefull if combined with a second reading sensor in order to carry out a second counting to be processed and compared with the first one.

As a further advantage of the invention, the use of small microprocessor units permits the latter to be introduced inside the containers already used for this purpose, and specifically the deflagration-proof containers, avoiding additional type-approvals of the components.

In order to offer a further protection to the trasmitted data, the electronic head C sends to the display D both a numeric non encrypted value corresponding to the supply and an encrypted data Xc. In the display microprocessor unit a specific encryption software is loaded which is able to process the encrypted data (drawing out a numeric value Nd) and the non-encrypted data, both referring to the performed count block 7 of FIG. 2.

During the manufacturing of the device it is also possible to introduce an identity code for the installed chip and firmware. This code can be associated to the private key of the device to be used as a validation "signature" of authenticity. The code allows the user to verify whether or not the present electronic is the original one, for example by means of a portable reader programmed with the encryption software of the system.

For the same purposes, the control officer can use a hardware key to be connected to the measuring device. Using this hardware key, the introduction of a predetermined input code will result in the visualization of a predetermined value by the display D. If this does not occur, it allerts the user to the fact that there is a system error or the system has been tampered with.

It is also possible to connect the electronic head to a local "host", of the kind already existing in many service stations, in order to verify from a remote position the proper functioning of the system and/or to send information or control data, for example to enable the electronic head replacement.

The present invention has been described with reference to a preferred embodiment. However, modifications can be made without stepping outside of the scope of the invention.

I claim:

1. Measuring device, particularly for fuel pumps in service stations, comprising a pulser equipped with a microprocessor unit and an electronic head equipped with a microprocessor unit, in which device the pulser and the electronic head are connected and mutually communicate information and data correlated with the N pulses of each supply; the information and the data are encrypted by means of an algorithm loaded in said microprocessor units and are sent to the electronic head from the pulser together with the pulses, in order to allow the verification and the validation of the trasmitted data.

2. Device according to claim 1, wherein the electronic circuits of the pulser are resine-coated in order to avoid tampering.

3. Device according to claim 1, wherein the private key and at least a part of the encryption algorithm of the head are loaded in the internal non re-readable memory area EEPROM.

4. Device according to claim 1, comprising a display equipped with a microprocessor unit and with an encryption software able to process the numeric counting values and the encrypted data received from the head.

5. Device according to claim 1, wherein said microprocessor units are based on non re-readable "OTP" microprocessors.

6. Device according to claim 1, using the same cables already installed in known fuel pumps.

7. Device according to claim 1, wherein said pulser can be inserted into the already installed containers of the known fuel pumps.

8. Device according to claim 1, wherein the encrypted data are processed by a dynamic public and private keys encryption software loaded in said microprocessor units.

9. Device according to claim 8, wherein on manufacturing in an internal EEPROM memory area of the head an identity code associated with said private key is introduced.

10. Method to control the measuring of the fuel supplied by devices which comprise a pulser, an electronic head, and a display, comprising the following operations: electronic head:

generates a new dynamic encryption key corresponding to each supply;

transmits said new dynamic encryption key to the pulser and to the display;

generates a resulting key obtained combining the dynamic key with a secret constant key which is known to the pulser, to the electronic head and to the display; pulser:

counts the pulses emitted by the pulser and produces a resulting key encrypted data;

transmits the pulses to the electronic head to carry out the counting; electronic head:

transmits to the pulser a signal of counting end; pulser:

transmits to the electronic head the encrypted data; electronic head:

decryptes the encrypted data from the pulser, extracts the numeric counting value, produces an encrypted data using the same encryption algorithm as the pulser and compares it with the encrypted data received from the pulser in order to reveal possible differences due to data tamperings;

transmits the encrypted data and the numeric counting value to the display; display:

extracts the numeric counting value from the encrypted data and compares it with the numeric counting values received in non-encrypted mode, in order to verify possible tampering.

11. Encoder device, comprising a microprocessor unit to count the pulses and to transmit/receive the counting data, and possible further data, related to the pulses transmission.

12. Encoder according to claim 11, wherein said microprocessor unit comprises an encryption algorithm which is processed in order to encode the counting data to be transmitted/received.

* * * * *